UNITED STATES PATENT OFFICE.

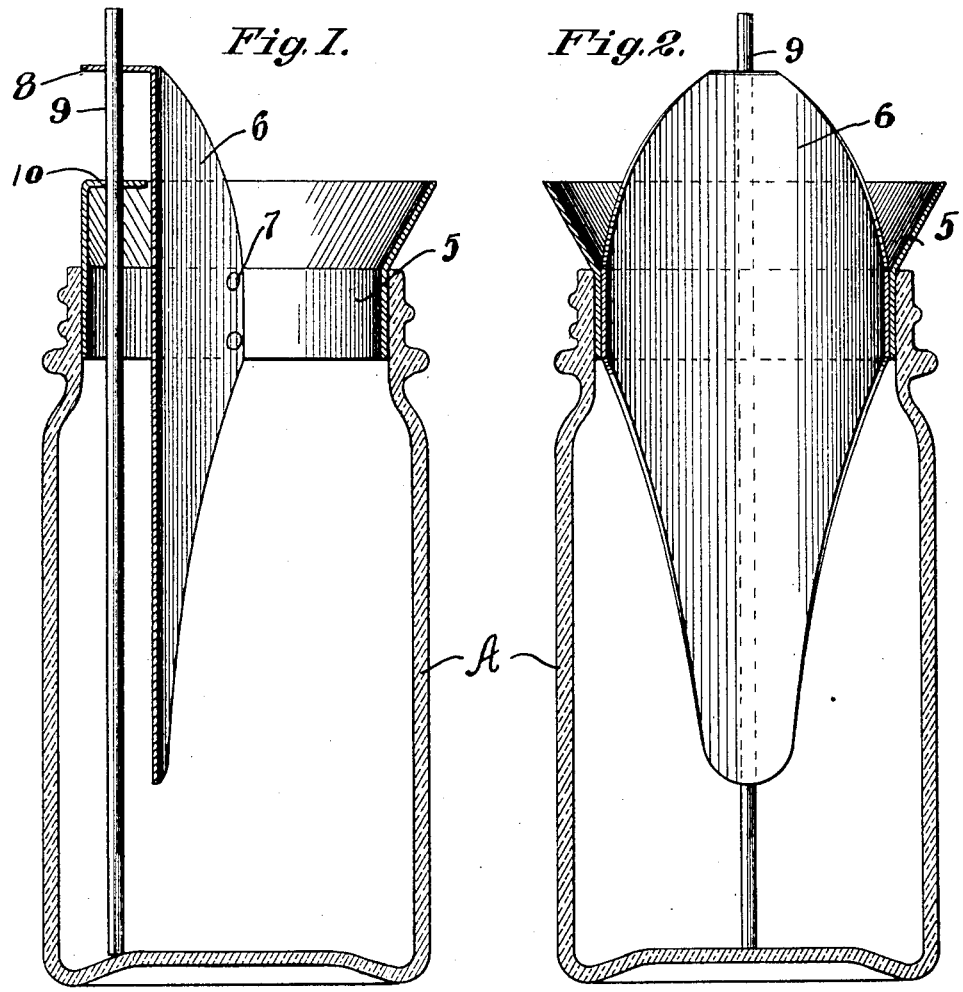
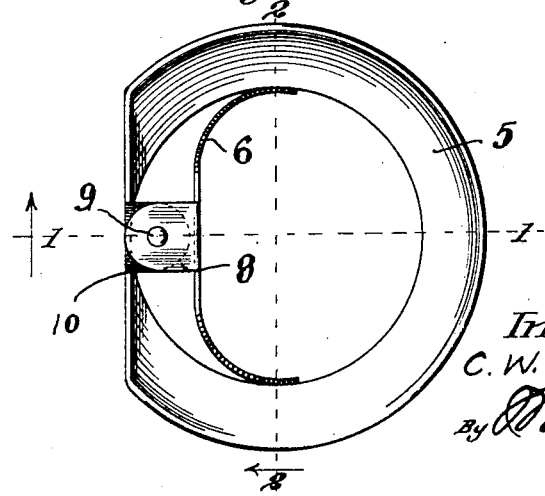

CHARLEY W. YOUNG, OF SAN JOSE, CALIFORNIA.

PROTECTING DEVICE FOR FRUIT-JARS AND THE LIKE.

1,387,749.  Specification of Letters Patent.  Patented Aug. 16, 1921.

Application filed March 21, 1921. Serial No. 454,167.

*To all whom it may concern:*

Be it known that I, CHARLEY W. YOUNG, a citizen of the United States, and a resident of San Jose, county of Santa Clara, and State of California, have invented a new and useful Protecting Device for Fruit-Jars and the like, of which the following is a specification.

My invention relates to protecting devices for fruit jars and glass containers in general.

The primary object of the invention is to produce a device which may be applied to fruit jars to protect and prevent the same from cracking when hot fruit is poured into them.

A further object of the invention is to provide an extremely simple and cheap device which may be sold upon the market at a cost which will enable the same to be used in households or other places for preserving purposes.

The invention possesses other advantages and features which will appear as the description now proceeds with reference to the accompanying drawing.

In said drawing, Figure 1, is a vertical section on the line 1—1, Fig. 3; Fig. 2 is a similar section on the line 2—2, Fig. 3; and Fig. 3 is a top plan view.

Referring now to the drawing in detail A represents a more or less conventional type of fruit jar which is used for preserving purposes. The device as proposed by the invention is in no way a permanent part of the jar, but is made to be applied to the neck thereof when required. In its preferred form the device includes a funnel (5), which is adapted to be applied to the neck of the jar and with an elongated curved protecting shield (6) riveted or otherwise fixed to the inside of the funnel as at (7) and supported perpendicularly within the jar. The upper edge of the protecting shield (6) is presented at right angles to offer an outward horizontal supporting lip (8) for the rod (9) which is supported thereby and extends vertically within the jar as best shown in Fig. 1.

The edge of the funnel in back of the protecting shield (6) is also made with an inwardly presented lip (10) which acts as a support for the rod (9) as does the lip (8). The rod is supported by these lips. As will be best seen from Fig. 3, the protecting shield (6) is curved to fully protect the rod (9) so that when hot fruit is poured into the jar the shield will prevent the same from contacting with the rod (9) until the fruit submerges the end of the same. The theory advanced as to the use of the device is on the same principle as using a spoon in a glass to prevent the same from cracking when hot liquid is poured into the glass, the present invention uses a rod which is protected and this added feature is highly desirable. The entire device with the exception of the rod may be made of sheet metal.

I claim:

In a device of the class described, a funnel adapted to be applied to a fruit jar or the like, an elongated protecting shield supported within said funnel and curved in cross section to correspond to the curvature of the funnel, a rod supported behind said protecting shield and adapted to extend into a fruit jar to which the device may be applied.

CHARLEY W. YOUNG.